No. 611,883. Patented Oct. 4, 1898.
G. W. BAKER.
LEATHER WORKING MACHINE.
(Application filed Sept. 27, 1897.)
(No Model.) 6 Sheets—Sheet 4.

WITNESSES
Carroll J. Webster
Philip C. Masi

INVENTOR
George W. Baker
by E. W. Anderson
his Atty.

No. 611,883. Patented Oct. 4, 1898.
G. W. BAKER.
LEATHER WORKING MACHINE.
(Application filed Sept. 27, 1897.)
(No Model.) 6 Sheets—Sheet 5.
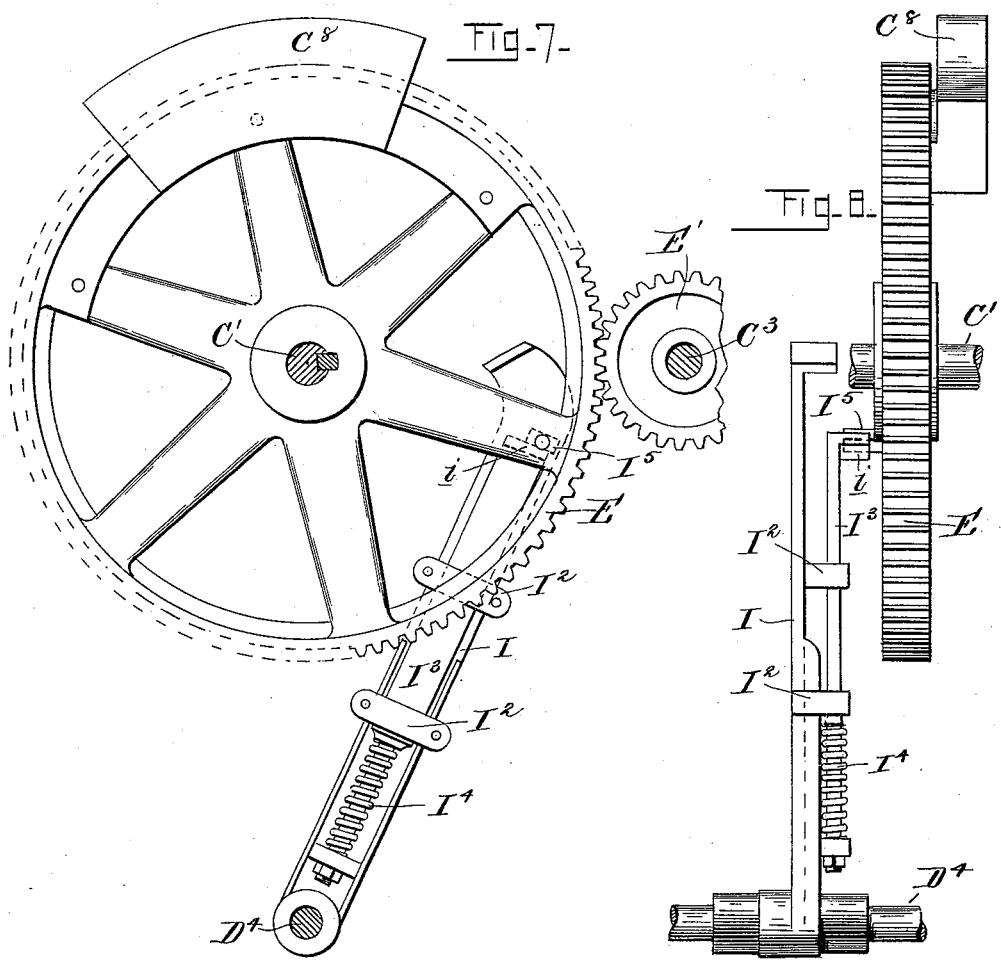
WITNESSES.
Carroll J. Webster
Philip C. Masi.
INVENTOR.
George W. Baker
by E. W. Anderson
his Atty.

No. 611,883. Patented Oct. 4, 1898.
G. W. BAKER.
LEATHER WORKING MACHINE.
(Application filed Sept. 27, 1897.)
(No Model.) 6 Sheets—Sheet 6.
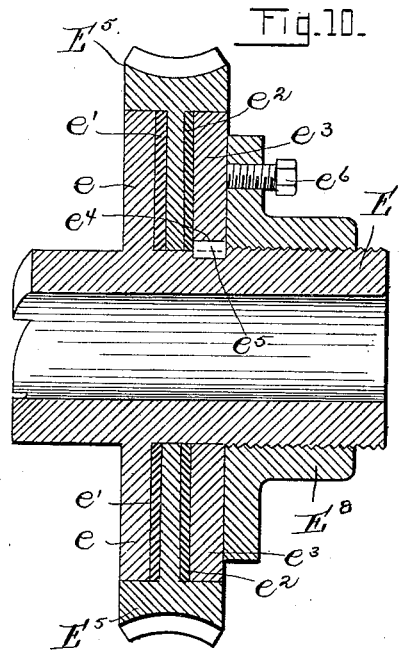
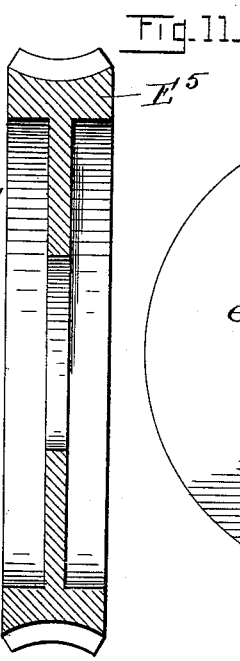
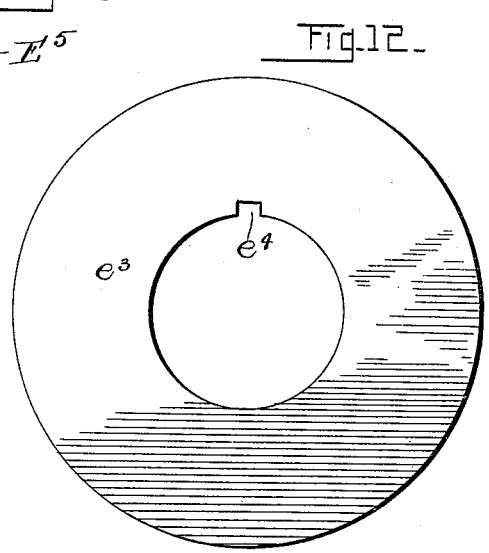
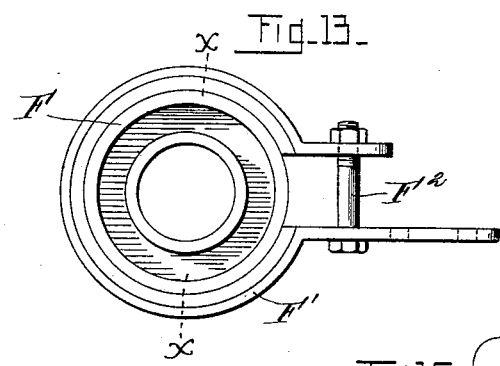
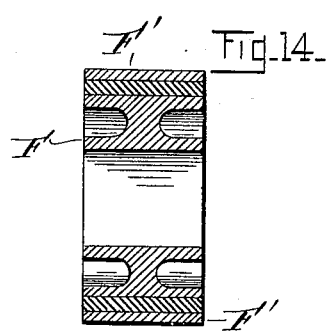
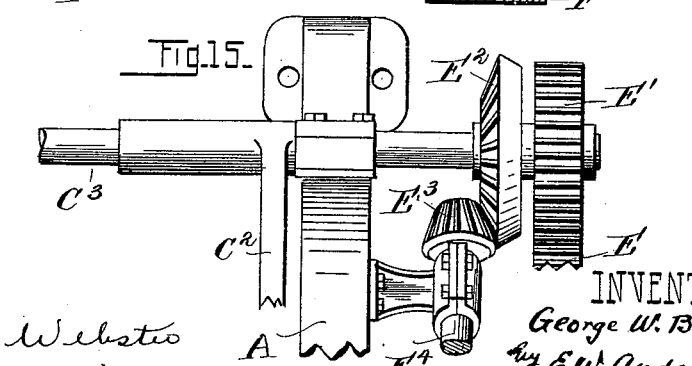
WITNESSES
Carroll J. Webster
Philip C. Masi
INVENTOR
George W. Baker
by E. W. Anderson
his Atty.
THE NORRIS PETERS CO., PHOTO-LITHO., WASHINGTON, D. C.

UNITED STATES PATENT OFFICE.

GEORGE W. BAKER, OF WILMINGTON, DELAWARE.

LEATHER-WORKING MACHINE.

SPECIFICATION forming part of Letters Patent No. 611,883, dated October 4, 1898.

Application filed September 27, 1897. Serial No. 653,152. (No model.)

*To all whom it may concern:*

Be it known that I, GEORGE W. BAKER, a citizen of the United States, and a resident of Wilmington, in the county of New Castle and State of Delaware, have invented certain new and useful Improvements in Machines for Working Hides, Skins, and Sides; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
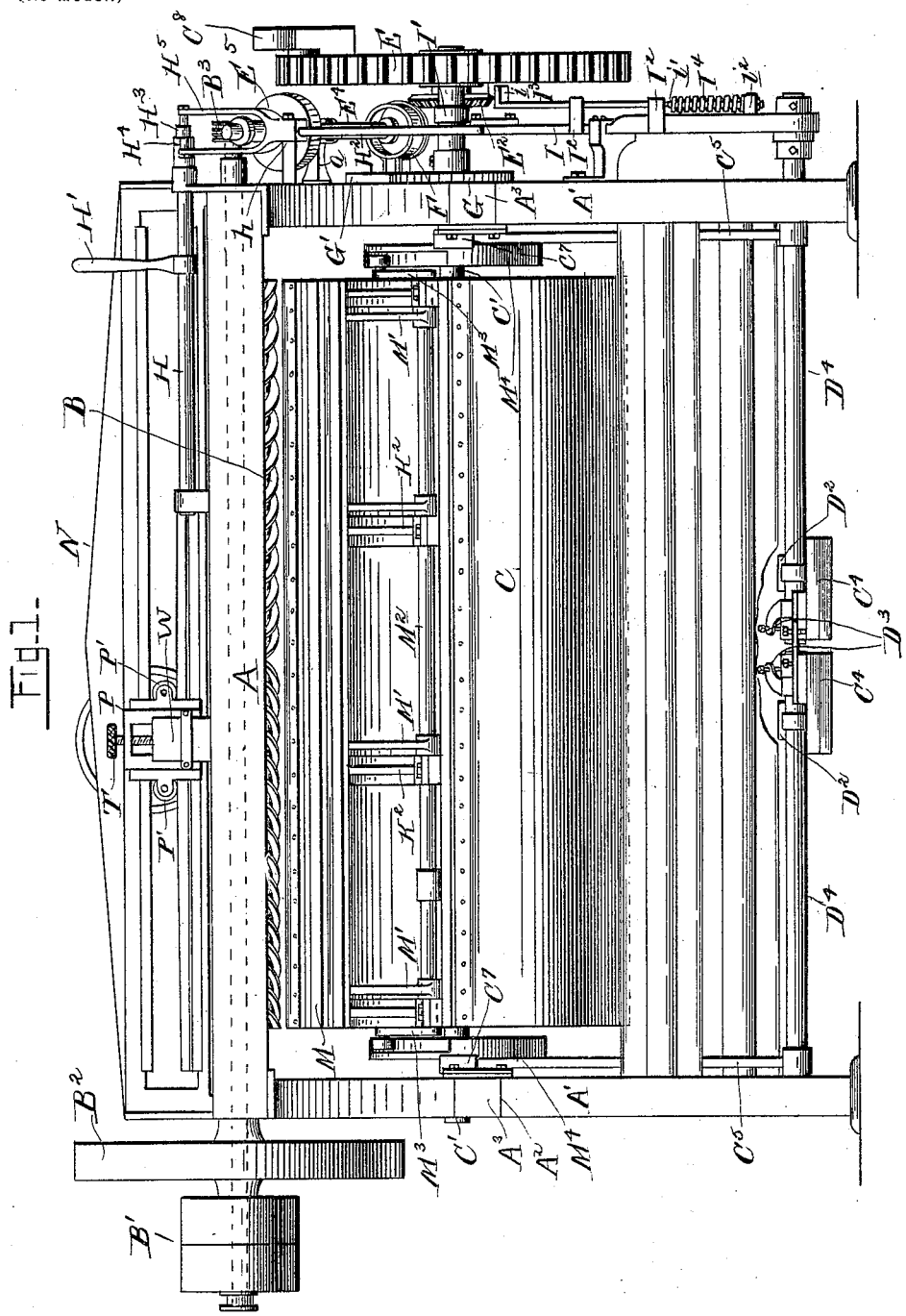
Figure 2:
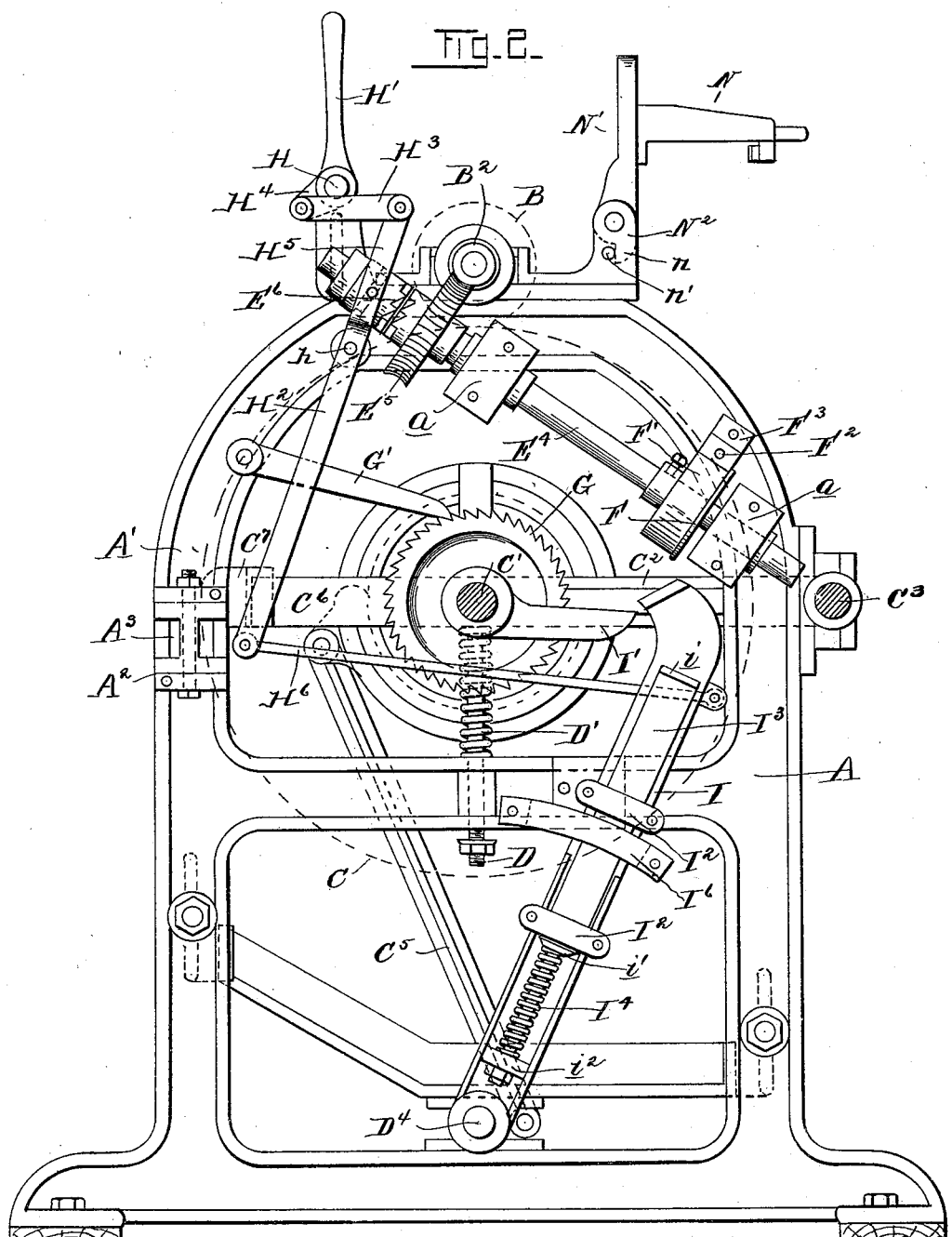
Figure 3:
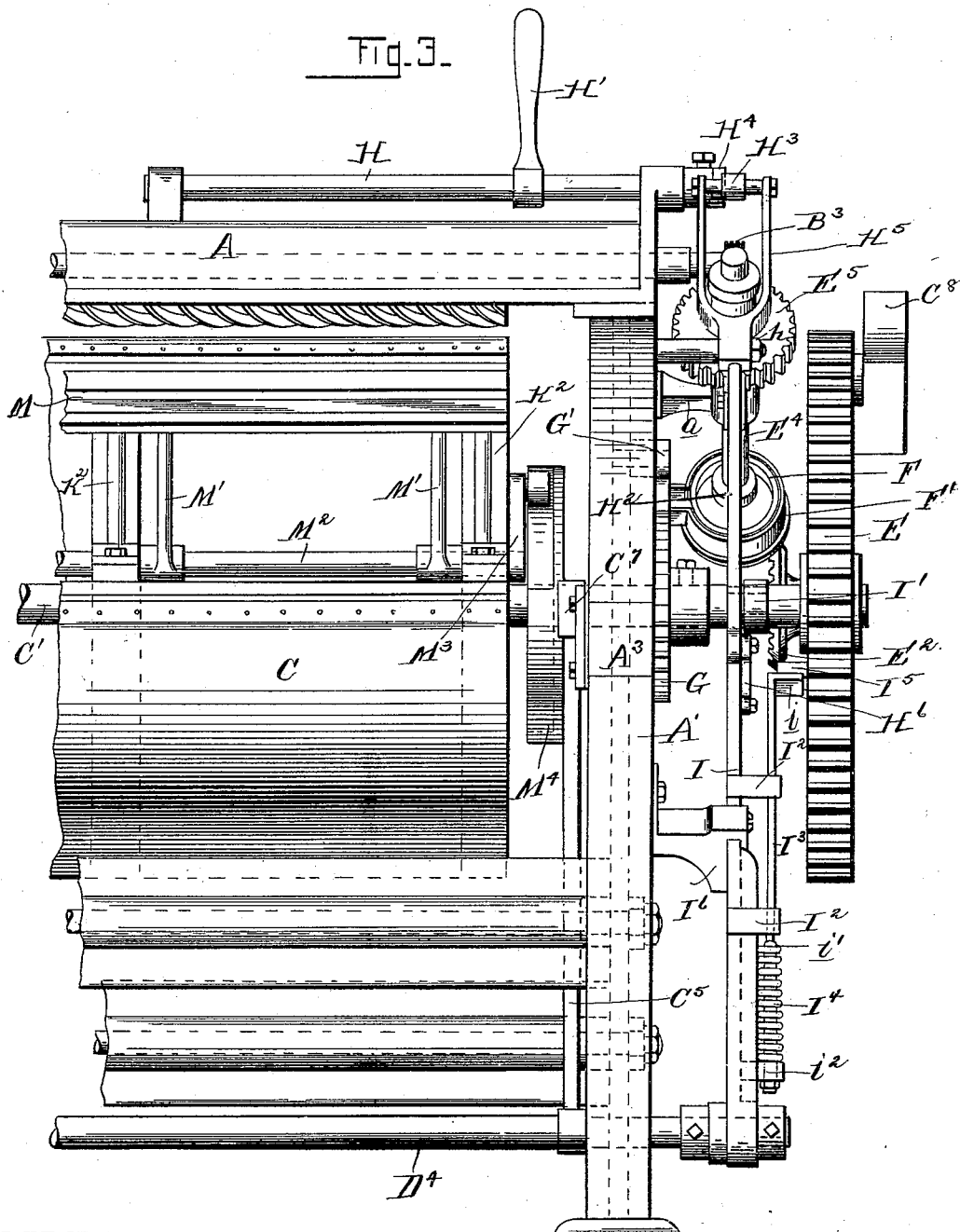
Figure 4:
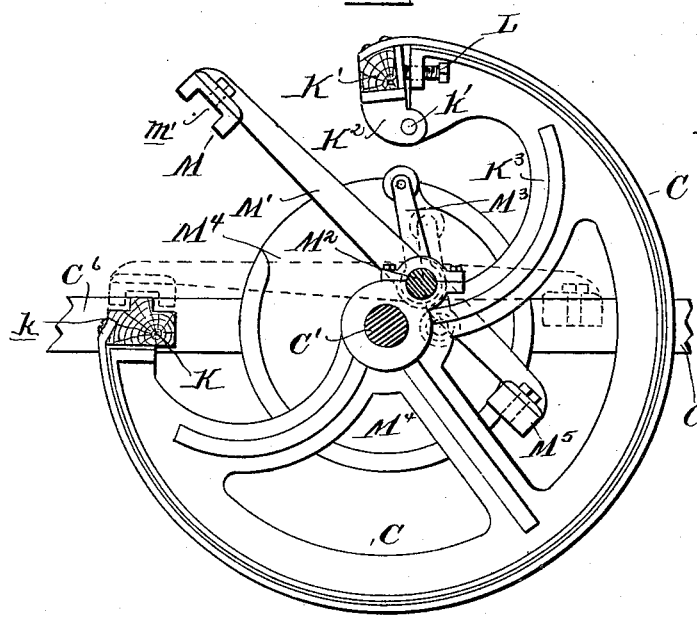
Figure 5:
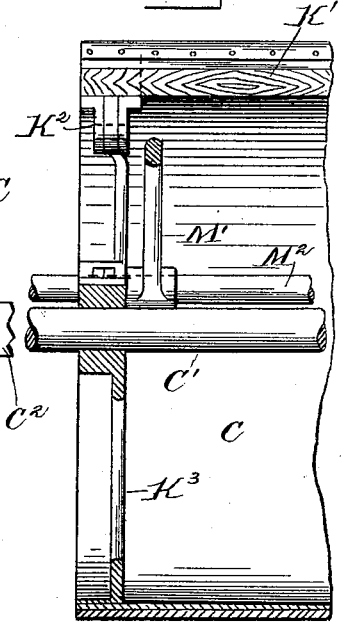
Figure 6:
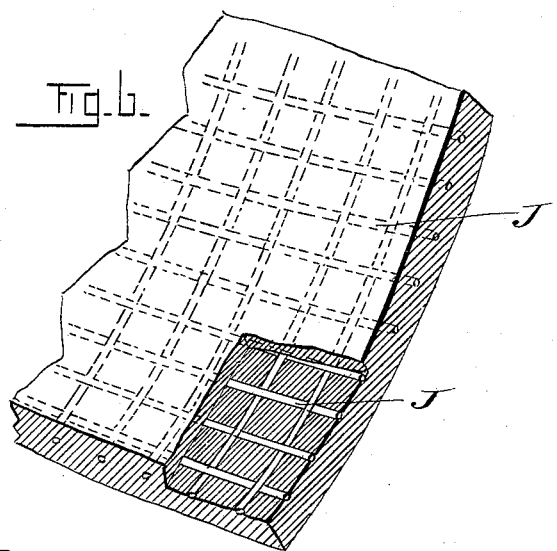

Figure 1 is a front elevation of a machine embodying my invention. Fig. 2 is an end view of the same with the end of the drum-shaft and the gear-wheel carried thereby removed. Fig. 3 is a front elevation of the right-hand end portion of the machine. Fig. 4 is a cross-section through the drum or cylinder-table. Fig. 5 is a longitudinal section of a portion of said drum or table. Fig. 6 is a perspective view of a portion of the drum-covering. Figs. 7 and 8 are detail views illustrating the stopping mechanism for the drum. Fig. 9 is a detail view of a frame-bracket. Figs. 10, 11, and 12 are detail views of the friction-clutch and its parts. Figs. 13 and 14 are detail views of the friction-brake. Fig. 15 is a fragmentary view of a portion of the gear. Fig. 16 is a front view of the grinding attachment. Fig. 17 is a section on the line $y\ y$, Fig. 16. Fig. 18 is a section on the line $x\ x$, Fig. 16.

This invention has relation to machines for working hides, skins, and sides, and more particularly to machines of the general character described and claimed in my Patents Nos. 497,941 and 512,088, dated May 23, 1893, and January 2, 1894, respectively, and designed for "fleshing," "working out," unhairing, &c.

The present invention is designed to improve certain features of the machine, and more particularly the segmental table or drum, the driving mechanism therefor, and the devices for stopping said table or drum at the proper time. Other minor objects will hereinafter appear.

With these objects in view the invention consists in the novel construction and combination of parts, all as hereinafter described, and pointed out in the appended claims.

Referring to the accompanying drawings, the letter A designates the frame of the machine. B is the tool or working cylinder, which is journaled in the upper portion of said frame, its shaft having at one end portion a fast-and-loose driving-pulley B' and a balance-wheel $B^2$. The opposite end portion of said shaft has a worm $B^3$.

C designates the segmental table or "drum," as it will hereinafter be termed. The shaft C' of said drum is journaled in arms $C^2$, which are pivoted at the rear portion of the machine on a non-rotary shaft or rod $C^3$, whereby said drum or either end portion thereof may be raised or lowered with respect to the tool-cylinder through the action of the two independent treadles $C^4$ and connections $C^5$ in the manner and for the purpose more fully described in my said Patent No. 512,088, to which and the Patent No. 497,941 reference may be had for a better understanding of the parts not specifically described herein.

D D designate the adjusting and supporting rods for the arms $C^2$, above referred to, and D' D' are the springs in connection therewith.

$D^2$ indicates counterbalance-weights for the treadles, and $D^3$ are stops and adjusting devices for said treadles.

E is a large gear-wheel which is fixedly mounted on one end portion of the drum-shaft and is driven by a pinion E', loosely sleeved on the non-rotary shaft $C^3$, before referred to.

$E^2$ is a bevel gear-wheel which is fixed to the sleeve of the pinion E' and whose teeth mesh with the teeth of a similar wheel $E^3$ on an oblique shaft $E^4$. The said shaft is journaled in brackets $a$, which are secured to one end of the frame A. This shaft also carries a worm-wheel $E^5$, which is driven by the worm $B^2$ on the tool-cylinder shaft, said worm-wheel being loosely mounted and put into driving connection with its shaft by means of a clutch $E^6$, which is operated in the manner presently described. The worm-wheel is not mounted directly on the shaft $E^4$, but upon a sleeve $E^7$, of the peculiar form shown in Fig. 10. This sleeve has a flange $e$, which seats within one of the recessed faces of the worm-wheel and against an interposed annular washer $e'$, of leather or other suitable material. Seated in the opposite face of the worm-wheel against a similar washer $e^2$ is an annulus or brass $e^3$, which has therein a key-seat $e^4$. $E^8$ is a lock-nut which is threaded upon the sleeve $E^7$ and screws against the said annulus. On the threaded portion of the sleeve is a key $e^5$, which engages with the key-seat $e^4$ and serves to lock the annulus to the sleeve in so far as rotary movement is concerned, but permitting the annulus to be moved along the sleeve. The lock-nut $E^8$ is tapped at opposite points to receive set-screws $e^6$, whose inner ends bear against the annulus. It will be readily seen that by this arrangement the worm-wheel has no positive connection with the sleeve, but that it depends upon friction to establish an operative engagement therewith; also, that the degree of friction can be accurately adjusted by means of the lock-nut $E^8$ and the set-screws $e^6$. Normally the friction is sufficient to form a driving connection, (when the clutch $e^6$ is in engagement with the said sleeve;) but in the event of the hide or skin being worked becoming wound or choked upon the drum in such a manner as to block the machine the worm-wheel will slip upon the sleeve $E^7$ and thereby prevent injury to the machine, such being the object and purpose of the construction and arrangement described.

F is a pulley which is fixed on the shaft $E^4$ at an intermediate portion thereof. $F'$ is a friction band or strap which passes around nearly the entire circumference of said pulley and whose upturned end portions are adjustably connected by a draw-bolt $F^2$. Said bolt also has a bearing in a bracket $F^3$ on the frame A. The friction band or strap may be of any suitable character, such as an outer portion of flexible metal with a lining of leather. Its purpose will hereinafter appear.

G designates a ratchet-wheel which is secured on the drum-shaft near one end, and $G'$ is a pawl which is arranged to engage the teeth of said wheel to prevent backward rotation of the drum.

The front standards $A'$ of the frame are cut at points opposite the drum-shaft to leave openings $A^2$ through which said shaft may be passed when it is desired to remove it and the drum from the machine for any purpose. Normally these openings are closed by removable sections $A^3$, as best shown in Fig. 3.

H is a short rock-shaft which is journaled at the upper forward portion of the frame, and $H'$ is a hand-lever secured thereto.

$H^2$ is a lever fulcrumed at $h$ at a point near its upper end, which is connected by a link $H^3$ with a forwardly-extending arm $H^4$ of the said shaft H. Said lever has a fork $H^5$, which engages the sleeve of the clutch $E^6$, before described. The lower arm of said lever is connected by a link $H^6$ with an arm I, the latter being pivoted at its lower end in the base of the machine, in the present instance on the treadle-shaft $D^4$. The upper end portion of said arm is bent slightly inward in position to be engaged by an arm $I'$ on the drum-shaft. Said arm I has guides $I^2$, in which is mounted a vertically-movable stop device $I^3$, having a projection $i$ at its upper end. $I^4$ is a spring which is coiled around the lower reduced portion of said stop device, being seated between the shoulders $i'$ thereof and a lug $i^2$ of the arm I.

$I^5$ is a stop projection carried by the gear-wheel E and designed to be engaged by the projection $i$ in the manner hereinafter described.

$I^6$ is a guide in which the arm I moves.

The arms $C^2$, in which the drum-shaft is journaled, are provided with forward extensions $C^6$, whose end portions are arranged to play in slotted brackets $C^7$ of the frame for the purpose of taking the thrust of the drum.

$C^8$ is a weight which is applied to the gear-wheel E at a point opposite the segmental opening of the drum to compensate for the loss in weight at this side of the drum and to approximately balance the same.

I will now describe certain other important improvements which I have made in the drum—viz., the covering therefor and the means for securing the same.

Heretofore it has been a difficult, if not impossible, matter to obtain a satisfactory covering for the drum, and various expedients have been resorted to to provide a covering which should be durable and able to withstand the action of the knives or blades of the tool-cylinder and at the same time possess the necessary yielding and elastic properties. Such expedients have not, however, in so far as I am aware, been successful to the required degree. At one time I employed for the purpose a plain sheet of rubber with canvas cemented to the lower side. This in time either rotted or wore off and soft spots would occur where the canvas became loosened. The knives of the tool-cylinder coming in contact with such spots soon cut the covering to such an extent as to render it useless. I now employ for the purpose a sheet of rubber which has embedded therein a sheet or layer J of wire-netting, (see Fig. 6,) which is preferably considerably nearer to the inner surface of the rubber than it is to the outer surface thereof, as indicated. The rubber should be of considerable thickness, preferably about one-half an inch, and the wire-netting should be of moderately coarse mesh. In manufacturing the covering the wire-netting is placed between superimposed layers of rubber and the whole is subsequently vulcanized and subjected to great pressure, the rubber being forced through the meshes of the wire. This layer or thickness J reduces to a great extent the stretching of the rubber without destroying its proper degree of elasticity and largely extends its life and usefulness. The body of the drum around which this covering is placed preferably consists of sheets of steel secured to metal spiders, as shown.

Considerable difficulty has also been experienced in properly stretching the covering around the drum in the first instance and in securing the same. Even when constructed as above described the covering will stretch to a considerable extent under the pressure of the tool-cylinder thereon and will push or buckle up in front of the said cylinder. The consequence is that the knives cut this surplus rubber, so that it is only a short time before the covering has to be renewed at a considerable expense. To overcome this difficulty and to provide means whereby the covering may not only be properly stretched upon the drum in the first instance, but may also be adjusted at any time to take up any slack which may occur, I secure said covering in the following manner: At that side or edge of the segmental opening in the drum where the action of the tool-cylinder upon the hide or skin commences I secure a block or clamp-piece K, preferably of wood, and which extends the full length of the drum. Its outer edge or face is recessed, as indicated at $k$, to seat therein one edge of the covering, which is secured thereto by screws, pins, nails, or other suitable fastening devices, whose heads are brought below the working surface of the drum and out of danger of contact with the knives or blades of the tool-cylinder. In applying the covering I next rotate the tool-cylinder at a reduced speed and thereby utilize the pressure of the same to stretch the covering until the opposite edge of the opening is nearly reached. This end or edge of the covering is then secured by nails, screws, or the like to a strip K', which is carried by a number of radial arms $K^2$; which are pivoted to the drum-frames $K^3$ at the points $k'$. Tapped into each of the said frames is a pressure or adjusting screw L, whose inner end bears against the adjacent arm $K^2$. By tightening the said screws it will be seen that the covering may be drawn tightly to the drum, and that if any slack subsequently occurs it can be readily taken up by a further adjustment of the screws. This arrangement also overcomes the objection above noted with reference to the buckling of the covering in advance of the tool-cylinder, since whatever action of this kind takes place is quickly relieved by the rubber pushing the radial arms $K^2$ away from the screws L. These arms therefore perform two functions of the first importance. Other suitable or equivalent means may, however, be employed.

M designates a clamp which holds the work to the drum and which is constructed and operated in substantially the same manner as in my said Patent No. 512,088. M' are the arms which carry said clamp; $M^2$, the rock-shaft to which said arms are connected and which is journaled in the frames $K^3$.

$M^3$ are arms at the respective end portions of the shaft $M^2$ and which carry each a roller $m$, which travels on the inner periphery of a fixed open cam-ring $M^4$ and thereby controls the operation of the clamp.

$M^5$ is a counterbalance-weight applied to the shaft $M^2$.

To give the clamp a better "bite," it may be formed with a grooved face $m'$, and the piece K with which it coacts may have a complementary or ribbed face, or reversely.

The operation of the machine as thus far described is as follows: The hides, skins, or sides are worked for length and are inserted underneath the clamp, about one-half the length thereof lying within the drum. The latter is then thrown into operation by means of the hand-lever H', which operates the clutch $E^6$. As the drum commences to revolve the clamp closes automatically to hold the work which is brought to the action of the tool-cylinder, the latter being driven at a high rate of speed, usually about thirteen hundred revolutions per minute. When the drum has made a nearly complete revolution, the clamp opens to release the work, and at about the same time the arm I' on the drum-shaft comes in contact with the pivoted arm I and rocks the latter to operate the connections $H^6$ $H^2$, whereby the clutch $E^6$ is moved to throw the worm-wheel $E^5$ out of gear. The same movement brings the projection $i$ of the stop device $I^3$ in position to engage the stop projection $I^5$ of the gear-wheel E and check further rotation of the drum, the action of the spring $I^4$ making the contact a yielding one. The engagement of the pawl G' with the ratchet-wheel G on the drum-shaft holds the drum against backward movement or vibration, said drum being, therefore, positively locked in stationary position while the work is being reversed end for end or while it is being removed and a new piece is being placed, after which the hand-lever is again moved to throw the worm-wheel into gear and the operation is repeated. When said worm-wheel is thrown out of gear, the friction-strap F' acts upon the pulley F to check the momentum of the shaft $E^4$ and thereby prevent the drum from being carried beyond a given center in throwing the arm I, which otherwise might sometimes occur, especially after the bearings become somewhat worn.

The drawings show the machine as provided with a grinding attachment N. This attachment, however, forms no part of the present application.

Having thus described my invention, what I claim as new, and desire to secure by Letters Patent, is—

1. In a machine of the class described, the combination of the drum, or segmental table, its shaft, and the pivoted arms in which said shaft has its bearings, said arms having forward extensions which engage slotted guides on the machine-frame, substantially as specified.

2. In a machine of the class described, the combination of the drum, or segmental table, its shaft, the arm and the gear-wheel on the said shaft, a rocking or pivoted arm adapted to be engaged and moved by the arm on the drum-shaft at a certain point in the revolution of the drum, and a yielding stop device carried by the said rocking or pivoted arm and adapted to engage the said gear-wheel and stop the same when the said arm is moved by its engagement with the arm on the drum-shaft, substantially as specified.

3. In a machine of the class described, the combination with the drum, or segmental table, its shaft, and the clutch-controlled driving-gear therefor, of stop devices for said drum, means carried by said shaft for operating said stop devices, connections between the stop devices and the clutch of the driving-gear whereby the latter is thrown out of operation at the same time the stop devices are thrown into operation, and a ratchet-and-pawl device for holding said drum against backward movement, substantially as specified.

4. In a machine of the class described, the combination of the drum, or segmental table, its shaft, the gear-wheel on said shaft having a stop projection, the arm also on said shaft, the pivoted arm adapted to be engaged by the arm on the drum-shaft, and the movable, spring-pressed stop device carried by the said pivoted arm and arranged to engage the stop projection on the gear-wheel, substantially as specified.

5. In a machine of the class described, the combination of the drum, or segmental table, its shaft, the gear-wheel on said shaft having a stop projection, the arm also carried by the said shaft, the clutch-controlled driving mechanism, the pivoted arm adapted to be engaged by the arm on the drum-shaft, the movable, spring-pressed, stop device carried by the said pivoted arm and adapted to engage the stop projection on the gear-wheel, and connections between the said pivoted arm and the clutch of the driving-gear whereby the latter is thrown out of gear at the proper time, substantially as specified.

6. In a machine of the class described, the combination of the driving-shaft, having a worm thereon, the drum, its shaft, the oblique shaft geared at one end to the drum-shaft, the worm-wheel frictionally mounted on said oblique shaft and adapted to be driven by the said worm, the clutch for controlling the operation of the said worm-wheel, the pulley fixed on said oblique shaft, and the friction band or strap on said pulley, substantially as specified.

7. In a machine of the class described, the combination with the driving-shaft, the drum, the drum-shaft, the gear-wheel on said drum-shaft having a stop projection, the arm also on said shaft, the oblique shaft geared to both the driving and drum shafts, and clutch devices for throwing the oblique shaft out of gear with the driving-shaft, of the pivoted arm adapted to be engaged by the arm on the drum-shaft, the yielding stop device carried by the said pivoted arm and arranged to engage the stop projection on the gear-wheel, a connection between said pivoted arm and the said clutch devices, and a friction device or brake arranged to act upon said oblique shaft, substantially as specified.

8. In a machine of the class described, the combination of the driving-shaft, the drum, its shaft, the oblique shaft geared to the drum-shaft, the flanged sleeve loosely mounted on said oblique shaft, the worm-wheel loosely mounted on said sleeve and adapted to be driven by a worm on the driving-shaft, said wheel seating in one of its faces the flange of said sleeve, the adjustable brass or annulus seated in the opposite face of said wheel and locked to said sleeve, the washers, and means for adjusting the said brass or annulus, substantially as and for the purpose described.

9. In a machine of the class described, the combination of the driving-shaft, the drum, its shaft, the oblique shaft geared to the drum-shaft, the flanged sleeve loosely mounted on said oblique shaft, the worm-wheel mounted on said sleeve and adapted to be driven by a worm on the driving-shaft, said wheel seating in one of its faces the flange of said sleeve, the adjustable brass or annulus seated in the opposite face of said wheel and locked to the said sleeve, the washers, the lock-nut threaded on said sleeve and seating against the outer face of said brass or annulus, and the adjusting-screws carried by said lock-nut and also bearing against the said brass or annulus, substantially as specified.

10. In a machine of the class described, the combination with a drum having a segmental opening, having a pivoted bar or strip at one edge thereof, and means for adjusting said bar or strip, of a yielding covering for said drum connected to said bar or strip at one edge portion and at its opposite edge portion fixedly secured to the drum at the opposite edge of the drum-opening, and means embedded in said covering for limiting its yielding or stretching movement under the action of the tool, substantially as specified.

11. In a machine of the class described, the combination with the drum, or segmental table, of a covering therefor, said covering consisting of a thick sheet of rubber having embedded therein a layer or thickness of wire-netting, said layer or thickness being nearer to the inner surface of the sheet than it is to the outer surface, substantially as specified.

12. In a machine of the class described, the combination with the drum having the segmental opening, of the recessed strip fixed at one edge of said opening, the bar or strip at the opposite edge of said opening, the hinged or pivoted radial arms which carry said bar or strip, the adjusting-screws which bear against the said arms, and the covering one edge of which is secured to the said recessed strip and the other edge to the said bar or strip, substantially as specified.

13. In a leather-working machine of the class described, a segmental rotary drum or table, and a covering therefor of yielding or elastic material having embedded therein a layer of wire-netting for the purpose of limiting its stretch in the direction of the pressure of the working tool thereon, substantially as specified.

14. In a machine of the class described, the combination with a drum having a segmental opening, of a movable bar or strip at one edge of the said opening, the pivoted arms which carry said bar, and means for adjusting the position of said bar, of a drum-covering secured at one edge to the said bar or strip and at its opposite edge fixedly secured to the opposite edge of said opening, substantially as specified.

15. In a leather-working machine, the combination with a rotary, segmental drum or table, of a covering therefor consisting of a sheet of ribbon having embedded therein a layer of wire-netting said covering being fixedly secured to said drum at one edge, and secured to a movable piece carried by the drum at its opposite edge, substantially as specified.

In testimony whereof I affix my signature in presence of two witnesses.

GEORGE W. BAKER.

Witnesses:
  GEO. H. PARMELEE,
  PHILIP C. MASI.